Feb. 25, 1930.  L. RICEFIELD  1,748,146
COUPLING
Filed Dec. 13, 1926   2 Sheets-Sheet 1

Louis Ricefield
INVENTOR.
BY Rector, Hibben,
Davis and Macauley
ATTORNEYS.

Witnesses:
Fidelis Maichen
Lolah L. Ross

Feb. 25, 1930. L. RICEFIELD 1,748,146
COUPLING
Filed Dec. 13, 1926 2 Sheets-Sheet 2

Witnesses:

Louis Ricefield
INVENTOR.
BY
ATTORNEYS.

Patented Feb. 25, 1930

1,748,146

UNITED STATES PATENT OFFICE

LOUIS RICEFIELD, OF OAK PARK, ILLINOIS

COUPLING

Application filed December 13, 1926. Serial No. 154,322.

This invention relates to improvements in couplings and its purpose is to provide means for forming a connection between shafts to permit relative longitudinal movement thereof and to permit relative radial displacement and angular misalignment of the axes of the shafts. The principal object of the invention is to provide an improved coupling having means for permitting axial movement of one of the connected shafts without imparting an end thrust to the other connected shaft. A further important object is to provide a coupling provided with coacting parts which have a rolling contact on each other. A further object is to provide a coupling in which the relative longitudinal movement of the connected shafts and inaccuracies in alignment of the shafts are compensated for by the rolling movement of power transmitting members embodied in the coupling. Still another object is to provide a coupling adapted to compensate for the displacement of the axes of the connected shafts and the axial misalignment of the shafts by the distortion of power transmitting members embodied in the coupling. Still another important object is to provide a silent, smooth running and resilient shaft coupling having greater freedom of action and a longer life than any form of coupling heretofore known. Other objects relate to various features of construction and arrangement which will appear more fully hereinafter.

Figure 1:
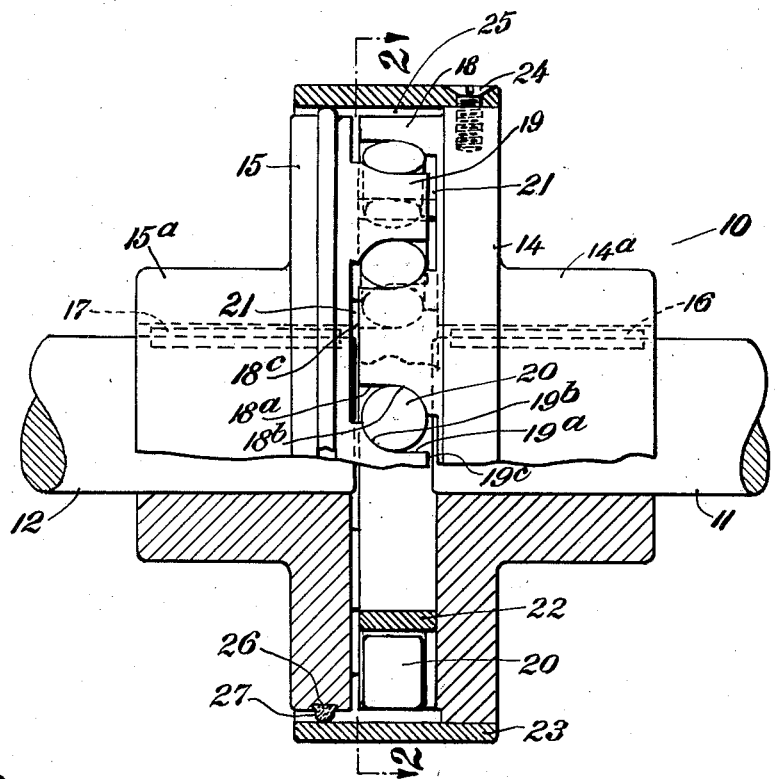
Figure 4:
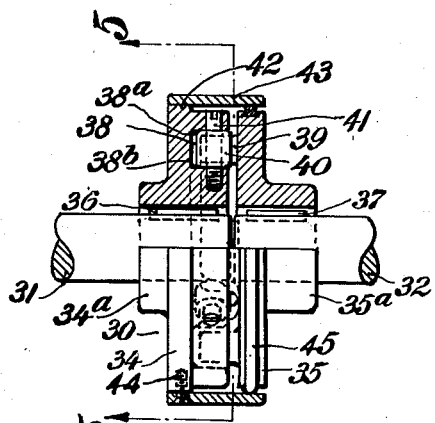
Figure 5:
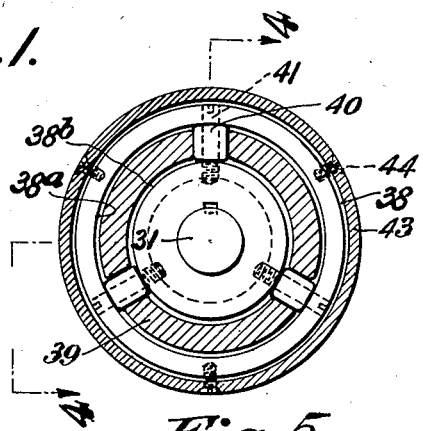
Figure 2:
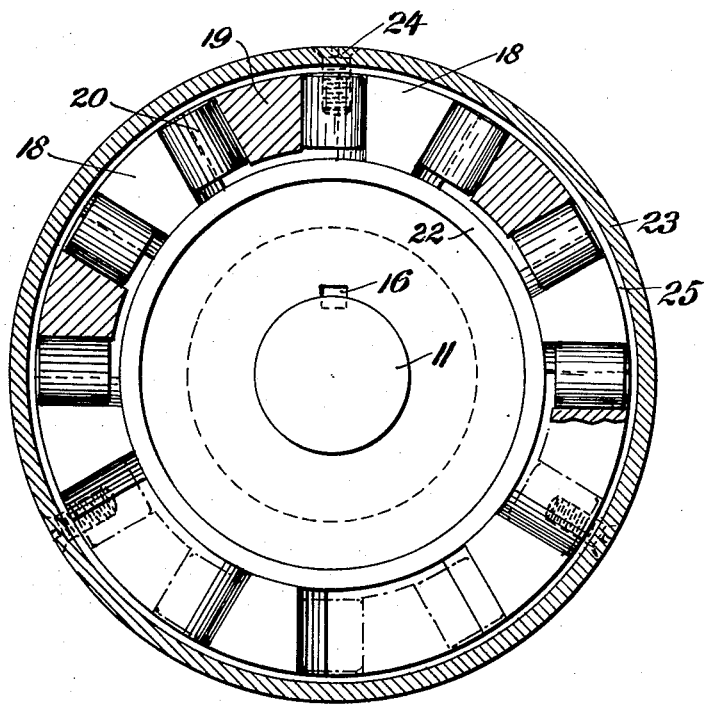
Figure 3:
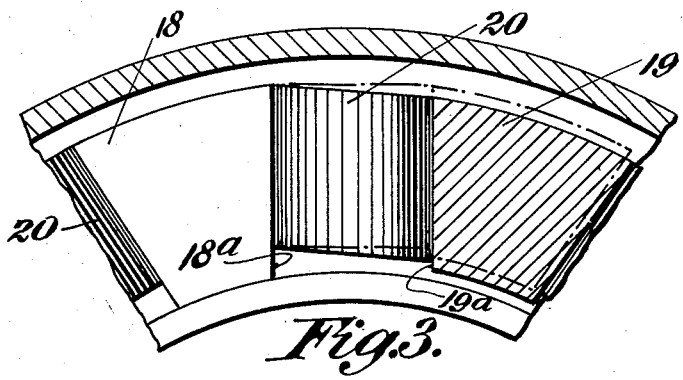

The nature of the invention will be understood from the following specification taken with the accompanying drawings in which two embodiments are illustrated. In the drawings, Figure 1 shows a side elevation of one form of the improved coupling with a portion thereof illustrated in vertical section taken through the axis of the coupling; Fig. 2 shows a transverse section taken on the line 2—2 of Fig. 1; Fig. 3 is a detailed sectional view showing the relative positions of adjacent jaws of the coupling and the distortion of one of the power transmitting rollers when the axes of the connected shafts are displaced radially; Fig. 4 is a side elevation of a modified form of the improved coupling with a portion thereof illustrated in vertical section taken through the axis of the coupling on the line 4—4 of Fig. 5, and Fig. 5 is a sectional view taken on the line 5—5 of Fig. 4.

As illustrated in Figs. 1, 2 and 3, the invention is shown as embodied in a coupling 10 which is employed to connect two rotatable shafts 11 and 12. The shaft 11 may be considered the driving shaft and the shaft 12 the driven shaft and for the purpose of explaining the advantages of the improved coupling the driving shaft 11 may be assumed to be the armature shaft of an electric motor which has a floating armature so that the shaft is adapted to oscillate longitudinally of its axis during rotation, although similar movements may take place in other rotating driving shafts. The shaft 11 has mounted thereon a coupling disk 14 provided with a hub 14$^a$ and the shaft 12 has mounted thereon a coupling disk 15 provided with a hub 15$^a$. The hubs 14$^a$ and 15$^a$ are secured to the shafts 11 and 12, respectively, by means of keys 16 and 17, respectively, so that each coupling disk has a driving engagement with its shaft. The inner faces of the disks 14 and 15 are spaced apart and the inner ends of the shafts 11 and 12 are similarly spaced, as shown in Fig. 1, and the disks are provided with alternately arranged jaws which project into this intervening space. The disk 14 is provided with a plurality of jaws 18 and the disk 15 is provided with a plurality of jaws 19 and the outer surfaces of all of these jaws form a common cylindrical surface interrupted by the spaces between the jaws, it being apparent that the jaws 18 project into the spaces between the jaws 19. Each jaw 18 is separated from the adjacent jaws 19 on both sides by power transmitting members 20 which, in the embodiment illustrated, are cylindrical in form although they might be otherwise shaped if the jaws were similarly modified. The power transmitting rollers 20 are formed preferably of rubber which should be relatively hard while retaining sufficient resiliency to permit some distortion when in use. If desired, the cores of the rollers may be formed of metal and the outer portions of the rollers of rubber. The axes of the rollers 20 are normally radial to the axes of the shafts 11 and 12 when these shafts are in perfect alignment and the faces 18ª and 19ª of the jaws 18 and 19, respectively, which contact with the rollers, lie in planes which are parallel to the axes of the rollers but the ends of these contacting surfaces adjacent the coupling disks are curved as shown at 18ᵇ on the jaws 18 and at 19ᵇ on the jaws 19, thus giving a broad base to each jaw at the place of connection thereof with its coupling disk. The rollers 20 are thus partially surrounded by the contacting portions of the jaws and when an end thrust is imparted to one of the shafts with the parts in the relative positions illustrated in Fig. 1, the thrust is imparted through the rollers and to the curved surfaces of the jaws, thus maintaining the radial positions of the rollers and preventing them from moving longitudinally of the shafts into contact with the disks 14 or 15. The rollers 20 and the jaws 18 and 19 are so proportioned that when the disks 14 and 15 are in the positions of closest proximity to each other, as shown in Fig. 1, the end faces 18ᶜ of the jaws 18 are spaced from the disk 15 and the end faces 19ᶜ of the jaws 19 are spaced from the inner face of the disk 14, these spaces being indicated at 21.

The coupling disk 14 is provided with two cylindrical flanges or sleeves for retaining the rollers 20 against radial displacement with respect to the axes of the shafts. These flanges or sleeves include an inner flange or sleeve 22 which is formed integrally with or attached to the disk 14 with its outer surface having a circumference slightly less than the circumference of the inner surfaces of the jaws 18 and 19. The other flange or sleeve 23 seats on the circumferential outer surface of the disk 14 and is secured thereon by cap screws 24. The sleeve 23 has an inner surface having a circumference larger than the circumference of the outer curved surfaces of the jaws 18 and 19, leaving an intervening space 25. For this purpose, the disk 14 is somewhat larger in diameter than the disk 15 and the inner surface of the sleeve 23 is consequently spaced outwardly from the outer surface of the disk 15 to permit relative lateral displacement of the axes of the shafts 11 and relative angular turning movement of one shaft with respect to the other shaft due to angular misalignment. The space between the flanges 22 and 23 is thus somewhat greater than the axial length of the rollers 20 so that some freedom of movement of the rollers is permitted although they are prevented from dropping radially inward by the flange 22 and are prevented from moving radially outward from centrifugal force by the outer flange 23. In order to form a dust-tight joint between the coupling members, the disk 15 is provided on its circumferential outer surface with a groove 26 having mounted therein an annular ring 27 formed of rubber, felt or other resilient material, although an extensible piston ring might be employed if desired. This ring 27 contacts with the inner surface of the flange 23 and maintains a tight joint while permitting the necessary relative movement of the flange 23 with respect to the disk 15.

The clearances between the parts of the coupling are such that if the shafts 11 and 12 are angularly misaligned, that is, so disposed that their axes do not form one continuous straight line, the inner face of one coupling disk 14 may become inclined to the inner face of the other coupling disk 15, instead of being parallel thereto, without interfering with the transmission of driving forces from one coupling member to the other. When the shafts are thus angularly misaligned, the error is compensated for by the uneven compression of the resilient transmitting rollers 20, each of which may be compressed with greater degree at one end than at the other to take care of the lack of parallelism of the disks 14 and 15. When there is a relative lateral displacement of the axes of the shafts, that error is taken care of by a longitudinal distortion of the material of the rollers 20, as illustrated on a somewhat magnified scale in Fig. 3. It will be seen that the rollers maintain their frictional engagement with the surfaces of the jaws 18 and 19 but that the peripheral portions of the rollers are distorted axially of the roller to permit the relative displacement of the jaws radially of the shafts which is brought about by the lateral displacement of the shafts. As the shafts rotate the rollers adjust themselves to this distortion without slipping on the jaws of the coupling members so that there is no undue wear on the rollers and a silent, frictionless, power transmitting connection is maintained. When there is a movement of one shaft longitudinally of its axis, as when the shaft 11 is the armature shaft of a motor, for example, the movement of the shaft is accommodated by the rolling of the rollers 20 on the surfaces of the jaws 18 and 19, the axes of the rollers being at right angles to the axes of the shafts. In this case, also, the compensation is effected by the action of a rolling movement of the power transmitting members so that the continual longitudinal shifting of one shaft does not operate to shorten the life of a coupling and the device may be continued in use very much longer than other forms of couplings heretofore in use. Of course, the conditions which have been mentioned may occur in conjunction with each other, that is, the shafts may be both angularly misaligned and laterally displaced and one shaft may at the same time have a longitudinal shifting movement but the rolling action of the power transmitting members combines with their compression and distortion to permit a perfect power transmission under these disadvantageous conditions. It will be observed that the jaws 18 and 19 are similarly formed on opposite faces and that each jaw contacts with two rollers so that a reversal in the direction of rotation of the shafts is taken care of radially without shock or disturbance although under running conditions the rollers 20 may be more or less compressed, regardless of matters of misalignment, depending upon the load being transmitted.

In Figs. 4 and 5 of the drawings there is illustrated a modified form of construction in which the power transmitting rollers, instead of being freely floating as in the first form of construction, are mounted on arbors or trunnions. In the modified form, the coupling 30 is shown connecting a shaft 31 with another shaft 32. The coupling 30 comprises a radial disk 34 having a hub 34ª and a coupling disk 35 having a hub 35ª. These hubs are keyed on the shafts 31 and 32 by the respective keys 36 and 37. The disk 34 is relatively thick measured parallel to the axis of the shaft 31 and is provided on its inner face with an annular groove or recess 38 which is adapted to receive a plurality of jaws 39 which are formed on the other disk 35. The outer wall 38ª of the recess 38 is spaced from the outer curved surfaces of the jaws 39 and the inner surface 38ᵇ of the recess is similarly spaced from the inner curved faces of these jaws so that sufficient clearance is provided to accommodate a lack of alignment of the shafts 31 and 32. The driving forces are transmitted from one shaft to the other through a plurality of rollers 40 which are mounted to rotate on arbors or trunnions 41 arranged preferably to have a threaded engagement with the inner annular wall of the recess 38 while their outer ends are formed for engagement by a screw driver, or the like so that they may be withdrawn when it is desired to renew or repair the roller. The rollers 40 are formed preferably of hard rubber but, as in the other embodiment of the invention, they may be formed with a metal core surrounded by a rubber covering, the latter construction being preferable in this instance because it affords a better bearing for the rollers on the trunnions 41. The faces of the lugs 39 which contact with the rollers 40 are preferably rounded adjacent the disk 35 so that the rollers and the disk 34 are prevented from engaging the inner face of the disk 35 and the ends of the shafts 31 and 32 are thereby kept out of contact with each other. The disk 34 is provided with an annular shoulder 42 on which is mounted the sleeve 43 which is secured in place by cap screws 44. This sleeve overlaps and is spaced from the outer peripheral surface of the disk 35 and, as in the other form of construction, a dust-tight joint is made by an annular resilient ring 45 of rubber, felt or the like, which is fixed in a groove in the disk 39 and arranged to contact with the inner surface of the sleeve 43.

With the arrangement of parts illustrated in Figs. 4 and 5, endwise movement of one of the shafts is permitted by the rolling of the rollers 40 on the faces of the lugs or jaws 39. A misalignment of the shafts is taken care of by the compression and distortion of the rollers but in this instance the power transmitted is transferred through the rollers to the trunnions 41 which are subjected to a double shearing action and are thus more effectively able to resist the thrust put upon them. Since all of the parts and the lack of alignment of the shafts are taken care of by the rolling of the members 20 or by the compression and distortion of the rollers, there are no surfaces which become readily worn and the coupling therefore has a long life.

Although two forms of the invention have been shown and described by way of illustration, it will be understood that the invention may be embodied in various other forms within the scope of the appended claims.

I claim:

1. The combination in a coupling for connecting substantially aligned shafts, of a pair of members each adapted to be fixed to one of said shafts, said members having jaws extending axially of said shafts and intermeshing alternately with each other, and a plurality of freely floating cylindrical resilient rollers each interposed between a pair of adjacent jaws and having a rolling contact with both of said jaws about axes extending radially of said shafts, said rollers being capable of movement along the faces of said jaws, the forces being transmitted from one shaft to the other through the contacting surfaces of said rollers and said jaws in directions acting always tangentially to a circle having its center at the axis of rotation of said shafts, excepting those forces which may be required to cause the rollers to follow the relative movements of the shafts.

2. The combination in a coupling for connecting substantially aligned shafts and allowing for relative longitudinal and angular movement and also for relative lateral displacement of said shafts, of a pair of members each adapted to be fixed to one of said shafts, said members having jaws extending axially of said shafts and intermeshing alternately with each other, the adjacent jaws on opposite members having opposed parallel flat faces spaced apart, and a plurality of freely floating resilient rolling members each interposed between a pair of adjacent jaws and having a rolling contact with said flat faces of both of said jaws, said rolling members being capable of movement on said flat faces of said jaws and having their centers on lines extending radially of the axes of said shafts, the forces being transmitted from one shaft to the other through the contacting surfaces of said rolling members and jaws acting in directions always tangential to a circle having its center at the axis of rotation of said shafts, excepting those forces which may be required to cause the rolling members to follow the relative movements of said shafts.

In testimony whereof, I have subscribed my name.

LOUIS RICEFIELD.